(12) United States Patent
Kimata et al.

(10) Patent No.: US 7,577,194 B2
(45) Date of Patent: Aug. 18, 2009

(54) EQUALIZER AND EQUALIZATION METHOD

(75) Inventors: Masayuki Kimata, Tokyo (JP); Shousei Yoshida, Tokyo (JP)

(73) Assignee: NEC Corporation, Tokyo (JP)

(*) Notice: Subject to any disclaimer, the term of this patent is extended or adjusted under 35 U.S.C. 154(b) by 594 days.

(21) Appl. No.: 11/480,164

(22) Filed: Jun. 30, 2006

(65) Prior Publication Data

US 2007/0002985 A1 Jan. 4, 2007

(30) Foreign Application Priority Data

Jun. 30, 2005 (JP) ............................. 2005-191805

(51) Int. Cl.
- *H03H 7/30* (2006.01)
- *H04B 1/10* (2006.01)

(52) U.S. Cl. ...................... 375/232; 375/350
(58) Field of Classification Search ................ 375/232, 375/233, 350
See application file for complete search history.

(56) References Cited

U.S. PATENT DOCUMENTS

| | | | | |
|---|---|---|---|---|
| 6,470,044 | B1* | 10/2002 | Kowalski | 375/148 |
| 2004/0005018 | A1* | 1/2004 | Zhu et al. | 375/340 |
| 2004/0141469 | A1* | 7/2004 | Jung et al. | 370/281 |
| 2006/0215747 | A1* | 9/2006 | Pietraski | 375/232 |
| 2008/0095226 | A1* | 4/2008 | Bar-Ness et al. | 375/233 |

FOREIGN PATENT DOCUMENTS

| | | |
|---|---|---|
| JP | 05-130079 | 5/1993 |
| JP | 07-177124 | 7/1995 |
| JP | 09-238099 | 9/1997 |
| JP | 2002-064466 | 2/2002 |
| JP | 2002-198878 | 7/2002 |
| JP | 2002-290294 | 10/2002 |
| JP | 2003-318780 | 11/2003 |
| JP | 2004-072380 | 3/2004 |
| JP | 2004-080555 | 3/2004 |
| WO | WO 01/48959 | 7/2001 |

OTHER PUBLICATIONS

D. Falconer, S.L. Ariyavisitakul, A. Benyamin-Seeyar, and B. Eidson, "Frequency Domain Equalization for Single-Carrier Broadband Wireless Systems", IEEE Commun. Mag., vol. 40, No. 4, pp. 58-66, Apr. 2002.

M. Matsumoto et al., "Accurate Channel Separation Schemes in MMSE-based Chip Equalizer for HSDPA Mobile Terminals", 2005, IEICE (The Institute of Electronics, Information and Communication Engineers) General Conference.

T. Tonegawa et al., "Suppression of Biomodal Stress-Induced Voiding Using High-Diffusive Dopant from Cu-alloy Seed Layer", IEEE, 2003, pp. 215-218.

* cited by examiner

*Primary Examiner*—Don N Vo
(74) *Attorney, Agent, or Firm*—Scully, Scott, Murphy & Presser, P.C.

(57) ABSTRACT

An equalizer calculates an equalization weight using a transmission channel response vector that arranges transmission channel estimation at the detection path timing and at the neighbor path timings thereof. The equalizer realizes excellent equalization characteristics by generating a transmission channel response vector that will not be affected by MPI by use of a multipath interference canceller (MPIC) to calculate the equalization weight.

29 Claims, 10 Drawing Sheets

P: PILOT SIGNAL
D: DATA SIGNAL
GI: GUARD INTERVAL

EQUALIZER AND EQUALIZATION METHOD

BACKGROUND OF THE INVENTION

1. Field of the Invention

The present invention relates to an equalizer and an equalization method, in particular relating to an equalizer and an equalization method for performing equalization of a received signal by calculating an equalization weight based on the minimum means-square error method (MMSE) or the zero-forcing method, using a transmission channel response vector based on transmission channel estimation in time domain.

2. Description of the Related Art

In the wireless communication schemes for next-generation mobile communications, it is important to realize high-speed data transmission. However, as the data rate becomes higher, interference between symbols due to multipaths, namely, multipath interference (MPI) becomes troublesome. There are various methods for suppressing MPI, and use of a linear equalizer is a relatively simple method. A frequency equalizer that performs this equalization process in frequency domain is disclosed, for example by D. Falconer, S. L. Ariyavisitakul, A. Benyamin-Seeyar, and B. Eidson, "Frequency Domain Equalization for Single-Carrier Broadband Wireless Systems", IEEE Commun. Mag., vol. 40, no. 4, pp. 58-66, April 2002 (literature 1). Also, a plural path samples method is disclosed by M. Matsumoto, S. Yoshida, A Ushirokawa, "Accurate Channel Separation Schemes in MMSE-based Chip Equalizer for HSDPA Mobile Terminals", in 2005IEICE (The Institute of Electronics, Information and communication engineers) General Conference, B5-120 (literature 2).

Figure 1:
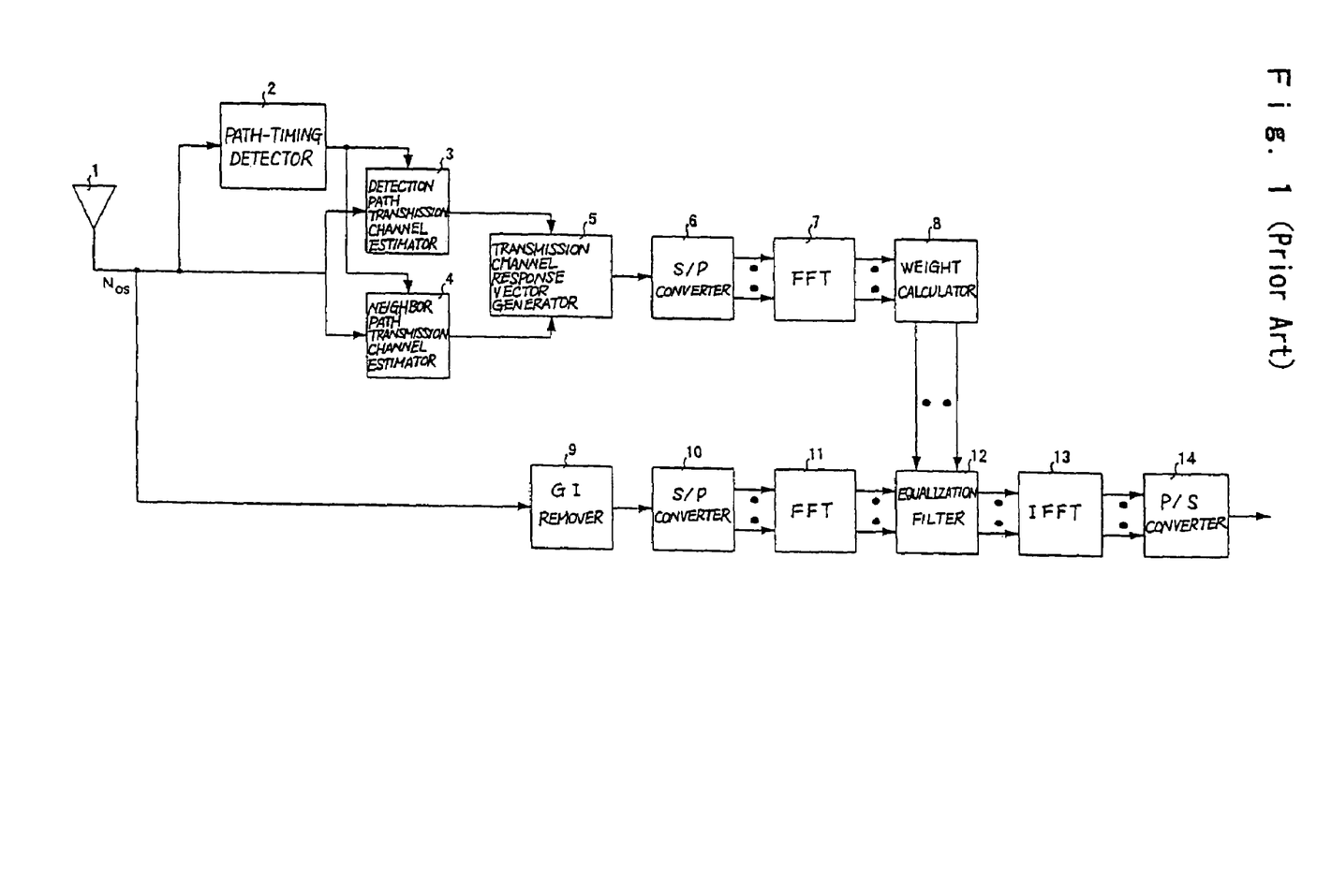
FIG. 1 is a block diagram showing one example of a conventional equalizer.

FIG. 1 shows one configurational example of a conventional equalizer in which the plural path samples method according to literature 2 is applied to the frequency equalizer described in the literature 1. The conventional equalizer is composed of receiving antenna 1, path-timing detector 2, detection path transmission channel estimator 3, neighbor path transmission channel estimator 4, transmission channel response vector generator 5, serial/parallel (S/P) converters 6 and 10, fast Fourier transform (FFT) portions 7 and 11, weight calculator 8, guard interval (GI) remover 9, equalization filter 12, inverse fast Fourier transform (IFFT) portion 13 and parallel/serial (P/S) converter 14. In the equalizer to which a plural path samples method is applied, representing each path with plural transmission channel estimation samples improves the equalization characteristics under an environment in which plural paths close to each other exist and provides the feature of having tolerance to path-timing errors.

Figure 2:
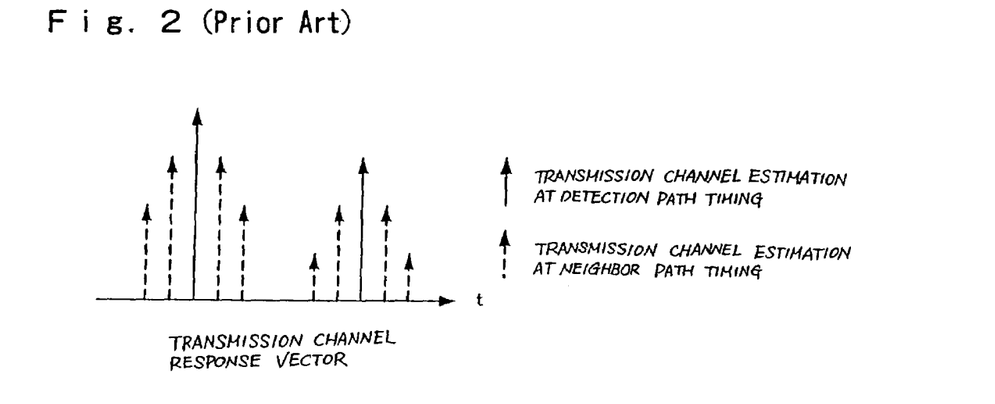
FIG. 2 is a diagram showing how a transmission channel response vector is generated in a conventional transmission channel response vector generator.

Receiving antenna 1 receives a digitally modulated single carrier signal. Path-timing detector 2 receives as its input samples of the received signal in oversampled number $N_{OS}$ and detects the timings of plural paths using pilot signals included in the received signal. Path-timing detector 2 uses a method of detecting the timings of plural paths having high levels based on the sliding correlation-detected result between the pilot signals contained in the received signal and a known pilot signal sequence, or the like. Detection path transmission channel estimator 3 receives as its input the received signal that is sampled in oversampled number $N_{OS}$ and the path timing detected at path-timing detector 2 and estimates a transmission channel estimation at the timing of the detection path, using the pilot signal contained in the received signal. Neighbor path transmission channel estimator 4 receives as its input the received signal that is sampled in oversampled number $N_{OS}$ and the path timings detected at path-timing detector 2 and estimates transmission channel estimations at plural timings (neighbor path timings) before and after the timing of the detection path, using the pilot signals contained in the received signal. Transmission channel response vector generator 5 receives as its input the transmission channel estimations estimated by detection path transmission channel estimator 3 and neighbor path transmission channel estimator 4 to generate a transmission channel response vector. FIG. 2 is a diagram showing how a transmission channel response vector is generated in transmission channel response vector generator 5. The solid line indicates a transmission channel estimation at a detection path timing while the broken line indicates a transmission channel estimation at a neighbor path timing. The transmission channel estimations (transmission channel estimations sampled for plural paths) at the detection path timing and at the neighbor path timings are arranged to generate a transmission channel response vector. S/P converter 6 performs S/P conversion of the transmission channel response vector generated at transmission channel response vector generator 5. FFT portion 7 receives as its input the transmission channel response vector that was converted at S/P converter 6 and outputs a frequency domain-converted transmission channel estimation. Weight calculator 8 receives as its input the frequency-domain transmission channel estimation output from FFT portion 7, and calculates the equalization weight of the equalization filter based on the minimum means-square error method (MMSE) or the zero-forcing method, etc. GI remover 9 receives the received signal sampled in oversampled number $N_{OS}$ and removes the part corresponding to GI from the received signal. S/P converter 10 performs S/P conversion of the received signal with GI removed at GI remover 9. FFT portion 11 receives the received signal that was converted by S/P converter 10 and performs conversion into frequency domain. Equalization filter 12 receives the equalization weight calculated at weight calculator 8 and the received signal that has been frequency converted at FFT portion 11 and performs equalization of the received signal in the frequency domain. IFFT portion 13 receives the frequency-domain equalized signal output from equalization filter 12 and converts it into time-domain, using IFFT. P/S converter 14 performs P/S conversion of the signal that has been converted in time-domain and outputs a demodulated signal.

In the conventional equalizer, the received signal is equalized and MPI is suppressed in equalization filter 12, but detection path transmission channel estimator 3, neighbor path transmission estimator 4 and transmission channel response vector generator 5 are affected by MPI when the transmission channel response vector used for equalization weight calculation is generated. Consequently, the accuracy of the equalization weight degrades, hence the conventional configuration suffers from the problem that the equalization performance of the received signal is poor.

SUMMARY OF THE INVENTION

It is an object of the present invention to provide an equalizer and equalization method capable of realizing excellent equalization characteristics in the equalizer in which a transmission response vector that is arranged with transmission channel estimations at a detection path timing and at the neighbor path timing is used for calculation of an equalization weight, by generating a transmission channel response vector that will not be affected by MPI by use of a multipath interference canceller (MPIC) to calculate the equalization weight.

In order to achieve the above object, the first equalizer presented by the present invention is an equalizer which receives a digitally modulated single carrier signal and calculates an equalization weight using a transmission channel response vector that is arranged with transmission channel estimations at the detection path timing and at the neighbor path timings thereof, and includes: a path-timing detector for detecting the timings of L paths (L is an integer equal to or greater than 1) based on a pilot signal time-multiplexed on a received signal that has been sampled at oversampled number $N_{OS}$; a pilot MPI replica generator for generating a pilot MPI replica signal for each path, based on the transmission channel estimation of the detection path; a pilot MPI replica remover for generating a pilot received signal with MPI removed by subtracting each of pilot MPI replica signals for other than a desired path, from the pilot received signal; a transmission channel response vector generator for generating a transmission channel response vector, based on the transmission channel estimations for the detection path and neighbor paths, using the pilot received signal with MPI removed; a weight calculator for calculating an equalization weight using the transmission channel response vector; and an equalization filter for performing equalization of the received signal with the equalization weight.

The second equalizer presented by the present invention is an equalizer which receives a digitally modulated single carrier signal and calculates an equalization weight using a transmission channel response vector that is arranged with transmission channel estimations at the detection path timing and at the neighbor path timings thereof, and includes: a path-timing detector for detecting the timings of L paths (L is an integer equal to or greater than 1) based on a pilot signal time-multiplexed on a received signal that has been sampled at oversampled number $N_{OS}$; a pilot MPI replica generator for generating a pilot MPI replica signal for each path, based on the transmission channel estimation of the detection path; a pilot MPI replica remover for generating a pilot received signal with MPI removed by subtracting each of pilot MPI replica signals for other than a desired path, from the pilot received signal; a first replica coefficient multiplier for estimating transmission channel estimations for the detection path and neighbor paths using the pilot received signal with MPI removed and multiplying each of the transmission channel estimations by a first replica coefficient $\alpha$ ($0<\alpha\leq 1$); a second replica coefficient multiplier for multiplying each of the transmission channel estimations for the detection path and neighbor paths, estimated at the previous stage, by a second replica coefficient ($1-\alpha$); an adder for adding the output from the first replica coefficient multiplier and the output from the second replica coefficient multiplier; a transmission channel response vector generator for generating a transmission channel response vector, based on the output from the adder, or the transmission channel estimations for the detection path and neighbor paths; a weight calculator for calculating an equalization weight using the transmission channel response vector; and an equalization filter for performing equalization of the received signal with the equalization weight.

The third equalizer presented by the present invention is an equalizer which receives a digitally modulated single carrier signal and calculates an equalization weight using a transmission channel response vector that is arranged with transmission channel estimations at the detection path timing and at the neighbor path timings thereof, and includes: a path-timing detector for detecting the timings of L paths (L is an integer equal to or greater than 1) based on a pilot signal time-multiplexed on a received signal that has been sampled at oversampled number $N_{OS}$; an upsampling processor for upsampling the received signal in oversampled number $N''_{OS}$ ($N''_{OS}=m N_{OS}$, m is an integer equal to or greater than 1 and a power of 2); a path-timing adjustor for adjusting the path timings that have been selected at the path-timing detector, based on high-resolution partial profile generation of their peripheral part; a pilot MPI replica generator for generating a pilot MPI replica signal for each path, based on the transmission channel estimations at the path-timings adjusted at the path-timing adjustor; a pilot MPI replica remover for generating a pilot received signal with MPI removed by subtracting each of pilot MPI replica signals for other than a desired path, from the pilot received signal; a transmission channel response vector generator for generating a transmission channel response vector, based on the transmission channel estimations for the detection path and neighbor paths, using the pilot received signal with MPI removed; a weight calculator for calculating an equalization weight using the transmission channel response vector; and an equalization filter for performing equalization of the received signal with the equalization weight.

In the equalizer of the present invention, it is possible to realize excellent equalization characteristics in the equalizer in which a transmission response vector that is arranged with transmission channel estimations at a detection path timing and at the neighbor path timing is used for calculation of an equalization weight, by generating a transmission channel response vector that will not be affected by MPI by use of a multipath interference canceller (MPIC) to calculate the equalization weight.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 3:
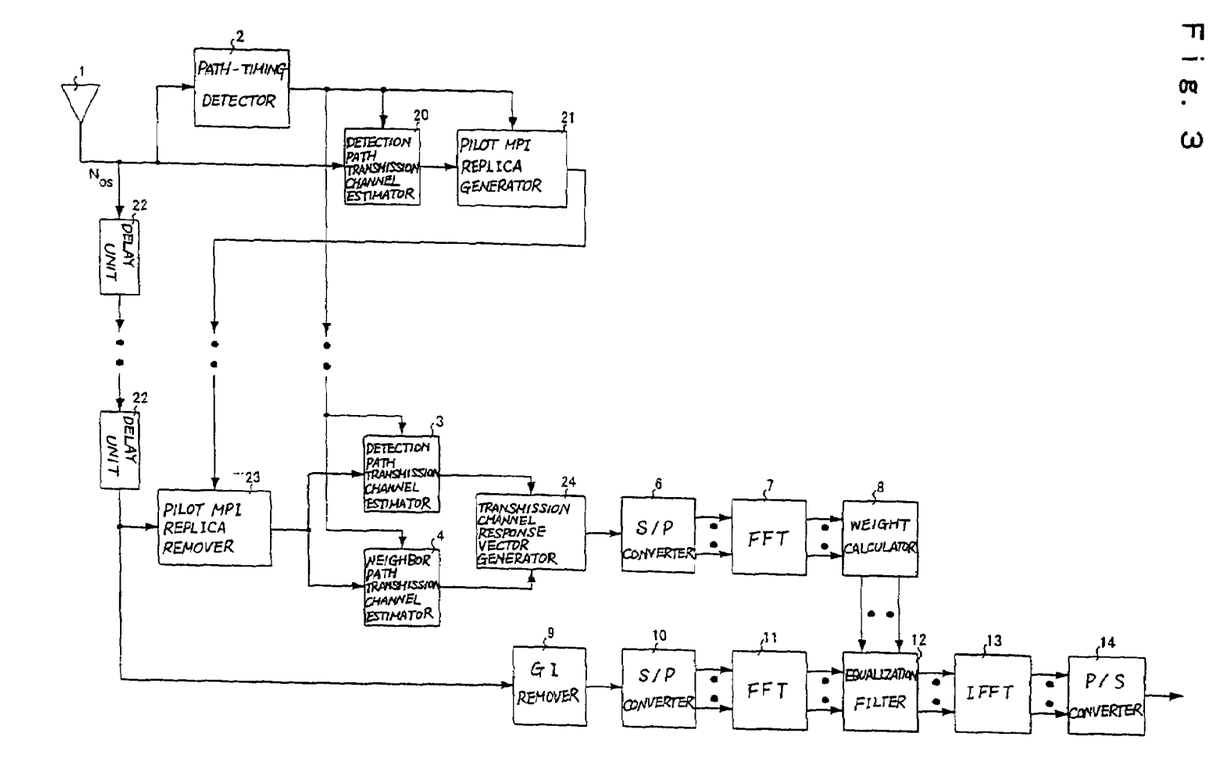
FIG. 3 is a block diagram showing one embodiment of an equalizer of the present invention.
Figure 4:
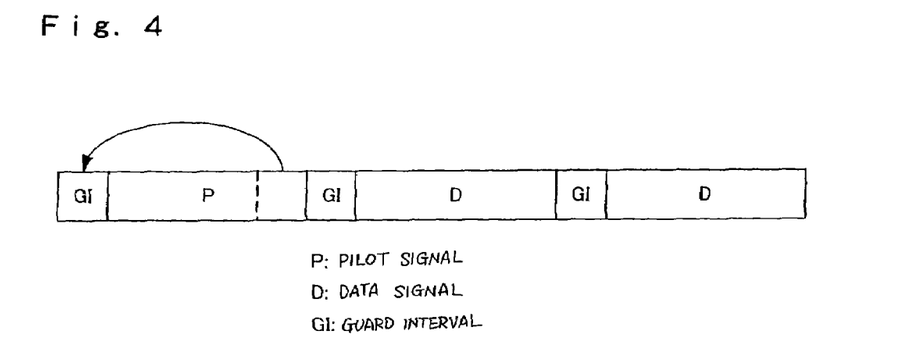
FIG. 4 is a diagram showing a frame signal format applied to an equalizer of the present invention.

Next, the first embodiment of the present invention will be described in detail with reference to the drawings. FIG. 3 is a block diagram showing one embodiment of an equalizer of the present invention, wherein the same components as those in FIG. 1 are allotted with the same reference numerals. In FIG. 3, the equalizer of the present invention is comprised of receiving antenna 1, path-timing detector 2, detection path transmission channel estimators 3 and 20, neighbor path transmission channel estimator 4, S/P converters 6 and 10, FFT portions 7 and 11, weight calculator 8, GI remover 9, equalization filter 12, IFFT portion 13, P/S converter 14, pilot MPI replica generator 21, delay unit 22, pilot MPI replica remover 23 and transmission channel response vector generator 24. FIG. 4 is a diagram showing a frame signal format applied to the equalizer of the present invention. The frame signal shown in FIG. 4 is time-multiplexed with a pilot signal and data signals and is divided into plural FFT blocks. In FIG. 4, the first block is totally occupied with the pilot signal. In order to avoid interference between blocks a GI is added to each FFT block. The present invention is characterized in that MPI in the pilot signal can be easily removed using the pilot signal that has been time-multiplexed on the received signal so that it is possible to generate a transmission channel response vector that is not affected by MPI.

Figure 5:
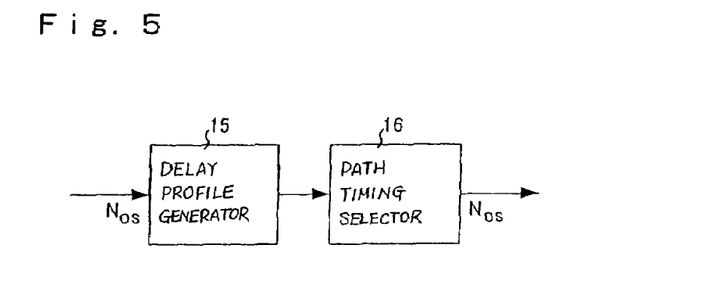
FIG. 5 is a block diagram showing a configuration of a path-timing detector of the present invention.

Receiving antenna 1 receives a digitally modulated single carrier signal. Path-timing detector 2 receives as its input samples of the received signal sampled in oversampled number $N_{OS}$ and detects the timings of L (L is an integer equal to or greater than 1) paths using the pilot signals time-multiplexed on the received signal. FIG. 5 is a block diagram showing the configuration of path-timing detector 2. Path-timing detector 2 is composed of delay profile generator 15 and path timing selector 16. Delay profile generator 15 receives the received signal sampled in oversampled number $N_{OS}$ and generates a delay profile based on the sliding correlation detected result between the pilot signal that has been time-multiplexed on the received signal and a known pilot signal sequence. Path timing selector 16 receives the delay profile generated by delay profile generator 15 and selects timings of plural paths having high levels.

Figure 6:
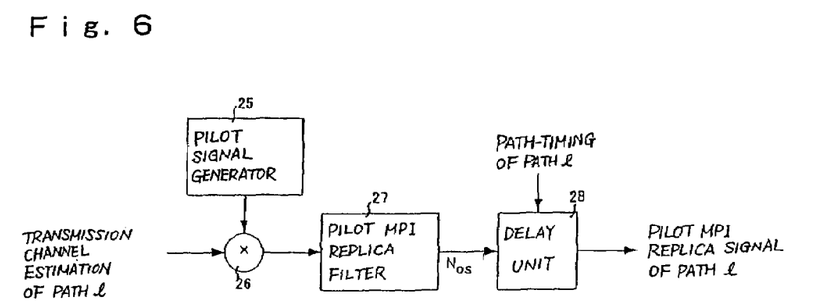
FIG. 6 is a block diagram showing a configuration of a pilot MPI replica generator in path I of the present invention.

Detection path transmission channel estimator 20 receives as its is input samples of the received signal in oversampled number $N_{OS}$ and the path timings detected at path-timing detector 2 and estimates transmission channel estimations at the timings of the detection paths using the pilot signal time-multiplexed on the received signal. Pilot MPI replica generator 21 receives the transmission channel estimations that were estimated at detection path transmission path estimator 20 and the path timings detected at path-timing detector 2 and generates a pilot MPI replica signal for each path. Since a pilot signal is a time-multiplexed and known symbol, MPI replica generation of an only pilot signal can be done relatively easily. FIG. 6 is a block diagram showing a configuration of pilot MPI replica generator 21 of path I ($1 \leq I \leq L$). Pilot MPI replica generator 21 is composed of pilot signal generator 25, multiplier 26, pilot MPI replica filter 27 and delay unit 28, and each path has the same configuration. Pilot signal generator 25 generates a known pilot signal. Multiplier 26 receives the transmission channel estimation estimated at detection path transmission channel estimator 20 in FIG. 3 and the known pilot signal generated at pilot signal generator 25 to generate a pilot MPI replica signal. Pilot MPI replica filter 27 shapes the waveform of the pilot MPI replica signal and performs conversion into oversampled number $N_{OS}$. Delay unit 28 receives the path timing detected at path-timing detector 2 in FIG. 3 and oversampled number $N_{OS}$ of pilot MPI replica signals converted through pilot MPI replica filter 27 and delays the pilot MPI replica signals by the path timing.

Figure 7:
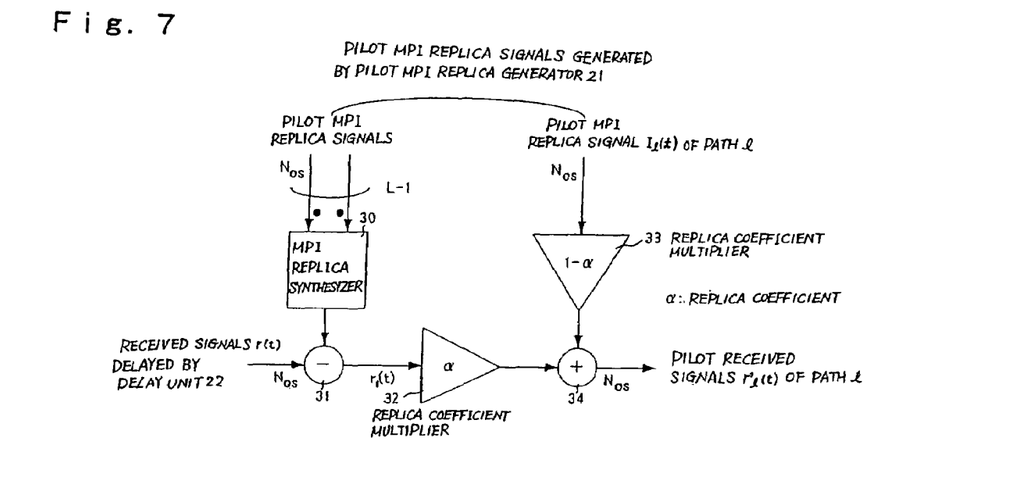
FIG. 7 is a block diagram showing a configuration of pilot MPI replica remover in path I of the present invention.

Delay unit 22 receives as its input samples of the received signal, in oversampled number $N_{OS}$ and delays the received signal by the processing time for generating pilot MPI replica signals. Pilot MPI replica remover 23 receives as its input oversampled number $N_{OS}$ of pilot received signal samples which have been delayed by delay unit 22 and oversampled number $N_{OS}$ of pilot MPI replica signals generated by pilot MPI replica generator 21 and subtracts the pilot MPI replica signals for other than the desired path from the pilot received signals of respective paths to generate pilot received signals with MPI removed. FIG. 7 is a block diagram showing a configuration of pilot MPI replica remover 23 for path I. Pilot MPI replica remover 23 is composed of MPI replica synthesizer 30, subtracter 31, replica coefficient multipliers 32 and 33 and adder 34. Each path has the same configuration. MPI replica synthesizer 30 receives as its input the pilot MPI replica signals generated at pilot MPI replica generator 21 in FIG. 3 and synthesizes (L−1) pilot MPI replica signals for other than path I. Subtracter 31 subtracts the pilot MPI replica signal that has been synthesized at MPI replica synthesizer 30 from oversampled number $N_{OS}$ of pilot received signals that have been delayed by delay unit 22 in FIG. 3 to thereby generate pilot received signal with MPI removed. When oversampled number $N_{OS}$ of pilot received signal samples that have been delayed by delay unit 22 are represented by r(t) and pilot MPI replica signal generated at pilot MPI replica generator 21 for path I is represented by $l_I(t)$, the pilot received signal for path I with MPI removed $r_I(t)$ can be represented as the following formula.

where $\tau_I$ represents the timing for path I, detected at path-timing detector 2. Replica coefficient multiplier 32 multiplies the pilot received signal with MPI removed, generated at subtracter 31, by $\alpha$ ($0 < \alpha \leq 1$). Here, $\alpha$ represent a replica coefficient. Replica coefficient multiplier 33 multiplies the pilot MPI replica signal for path I, generated at pilot MPI replica generator 21, by $(1-\alpha)$. Adder 34 adds the signal that is obtained by multiplying the pilot received signal with MPI removed by a and the signal that is obtained by multiplying the pilot MPI replica signal for path I by $(1-\alpha)$. Pilot received signal for path I with MPI removed, added at adder 34 is represented as $r'_I(t)$ with the following formula.

Figure 8:
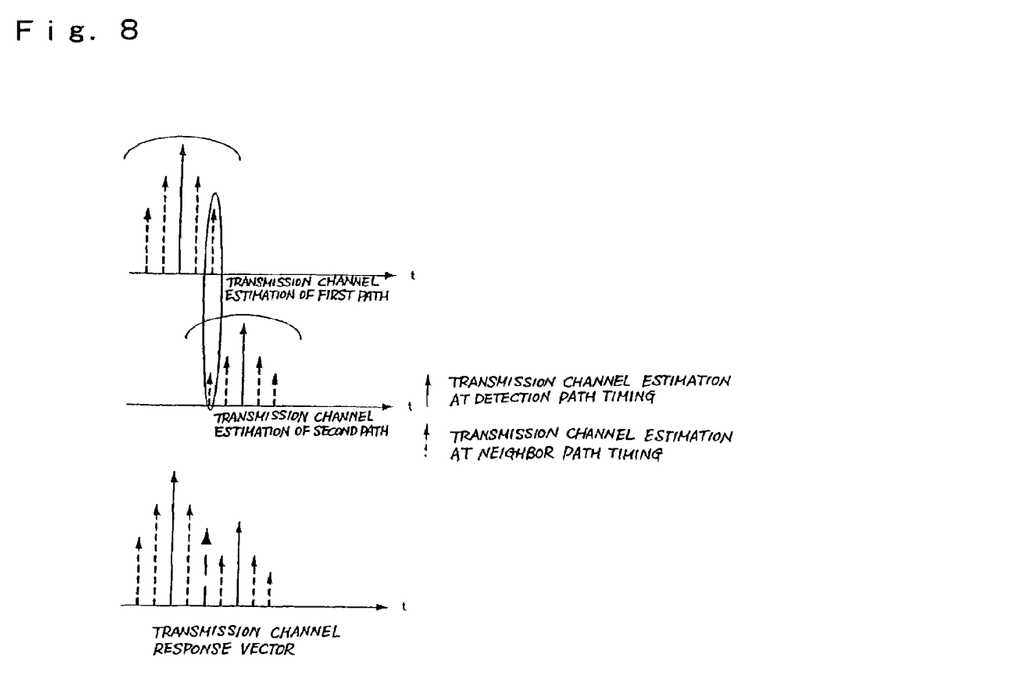
FIG. 8 is a diagram showing how a transmission channel response vector is generated in a transmission channel response vector generator of the present invention.

The pilot received signal with MPI removed, added at adder 34, is sent to detection path transmission channel estimator 3 and neighbor path transmission channel estimator 4 in FIG. 3. Detection path transmission channel estimator 3 receives as its input oversampled number $N_{OS}$ of pilot received signal with MPI removed at pilot MPI replica remover 23 and the path timing detected at path-timing detector 2, and estimates the transmission channel estimation at the timing for the detection path using the pilot signal time-multiplexed on the received signal. Neighbor path transmission channel estimator 4 receives as its input oversampled number $N_{OS}$ of pilot received signals with MPI removed at pilot MPI replica remover 23 and the path timings detected at path-timing detector 2 and estimates the transmission channel estimations at the timings for the neighbor paths using the pilot signals time-multiplexed on the received signal. Transmission channel response vector generator 24 receives as its input the transmission path estimations estimated at detection path transmission channel estimator 3 and neighbor path transmission channel estimator 4 to generate a transmission channel response vector. FIG. 8 is a diagram showing how a transmission channel response vector is generated in transmission channel response vector generator 24. The solid line indicates a transmission channel estimation at a detection path timing while the broken line indicates a transmission channel estimation at a neighbor path timing. The transmission channel response vector is generated by arranging the transmission channel estimations at the detection path timing and at the neighbor path timings. If the position of a neighbor path timing of a path overlaps that of another neighbor path timing, the transmission channel response vector may be preferably generated by synthesizing the transmission channel estimations of paths. FIG. 8 shows an example with L=2, in which it is possible to generate a transmission channel response vector that is not affected by MPI, by removing MPI replica based on the transmission channel estimations for detection paths other than the desired path and based on performing transmission channel estimation of the detection path and neighbor paths.

S/P converter 6 performs S/P conversion of the transmission channel response vector generated at transmission channel response vector generator 24. FFT portion 7 receives as its input the transmission channel response vector that has been converted at S/P converter 6 and outputs a frequency-domain converted transmission channel estimation. Weight calculator 8 receives as its input the transmission channel estimation in frequency-domain output from FFT portion 7, and calculates the weight of the equalization filter based on MMSE or the zero-forcing method, etc. GI remover 9 receives as its input samples of the received signal oversampled by number $N_{OS}$ and delayed by delay unit 22 and removes the part corresponding to GI from the received signal. S/P converter 10 performs S/P conversion of the received signal with GI removed by GI remover 9. FFT portion 11 receives as its input the received signal converted by S/P converter 10 and performs conversion into frequency domain. Equalization filter 12 receives the equalization weight calculated at weight calculator 8 and the received signal that has been frequency converted at FFT portion 11, and performs equalization of the received signal in frequency domain. IFFT portion 13 receives the frequency-domain equalized signal output from equalization filter 12 and performs conversion into time-domain, using IFFT. P/S converter 14 performs P/S conversion of the signal that has been converted in time-domain and outputs a demodulated signal.

Figure 9:
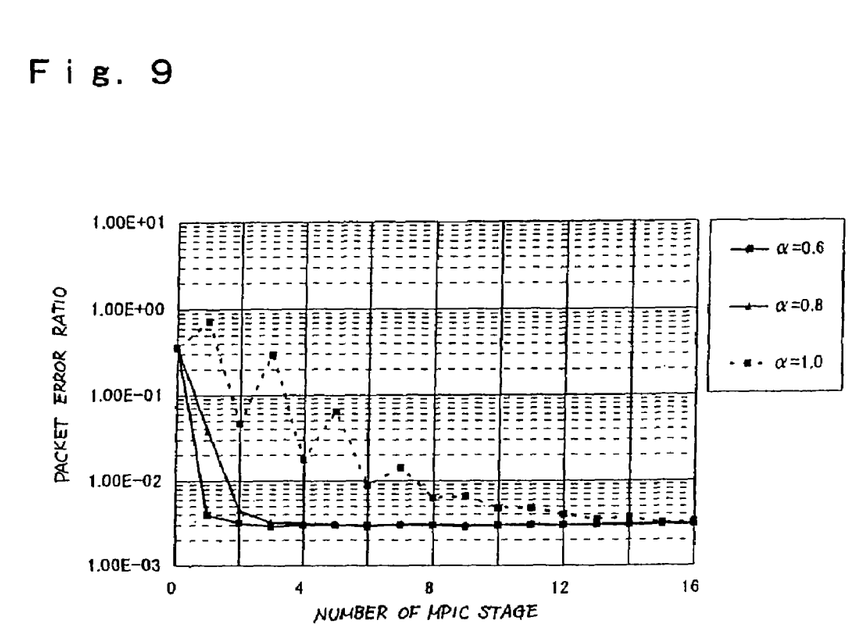
FIG. 9 is a chart showing convergence characteristics of the packet error ratio to replica coefficient $\alpha$ of the present invention.

In the equalizer of the present invention, it is possible to make further improvement in characteristics by iteration of the processing in pilot MPI replica generator 21 and pilot MPI replica remover 23 for plural number of stages. FIG. 9 shows convergence characteristics of the packet error ratio to replica coefficient $\alpha$. The horizontal axis represents the number of MPIC stages and the vertical axis represents the packet error ratio. The case where replica coefficient $\alpha=1$ corresponds to simple removal of MPI; the characteristics behavior is hard to converge by the Ping-Pong effect if the number of stages has increased. Setting replica coefficient $\alpha$ to be smaller than 1 can suppress the Ping-Pong effect and drastically improve the characteristics. Thereby, it can to converge the characteristics with a lower number of stages. In the example shown in FIG. 9, adequate enough characteristics can be obtained with one or two stages when $\alpha=0.6$.

As described heretofore, in the present embodiment, it is possible to realize excellent equalization characteristics, by generating a transmission channel response vector free from MPI influence by use of MPIC, which is achieved by repeating the processing in pilot MPI replica generator 21 and pilot MPI replica remover 23 for plural number of stages, and by using the vector to calculate the equalization weight. Further, control of replica coefficient $\alpha$ makes it possible to realize good characteristics with a lower number of stages.

Figure 10:
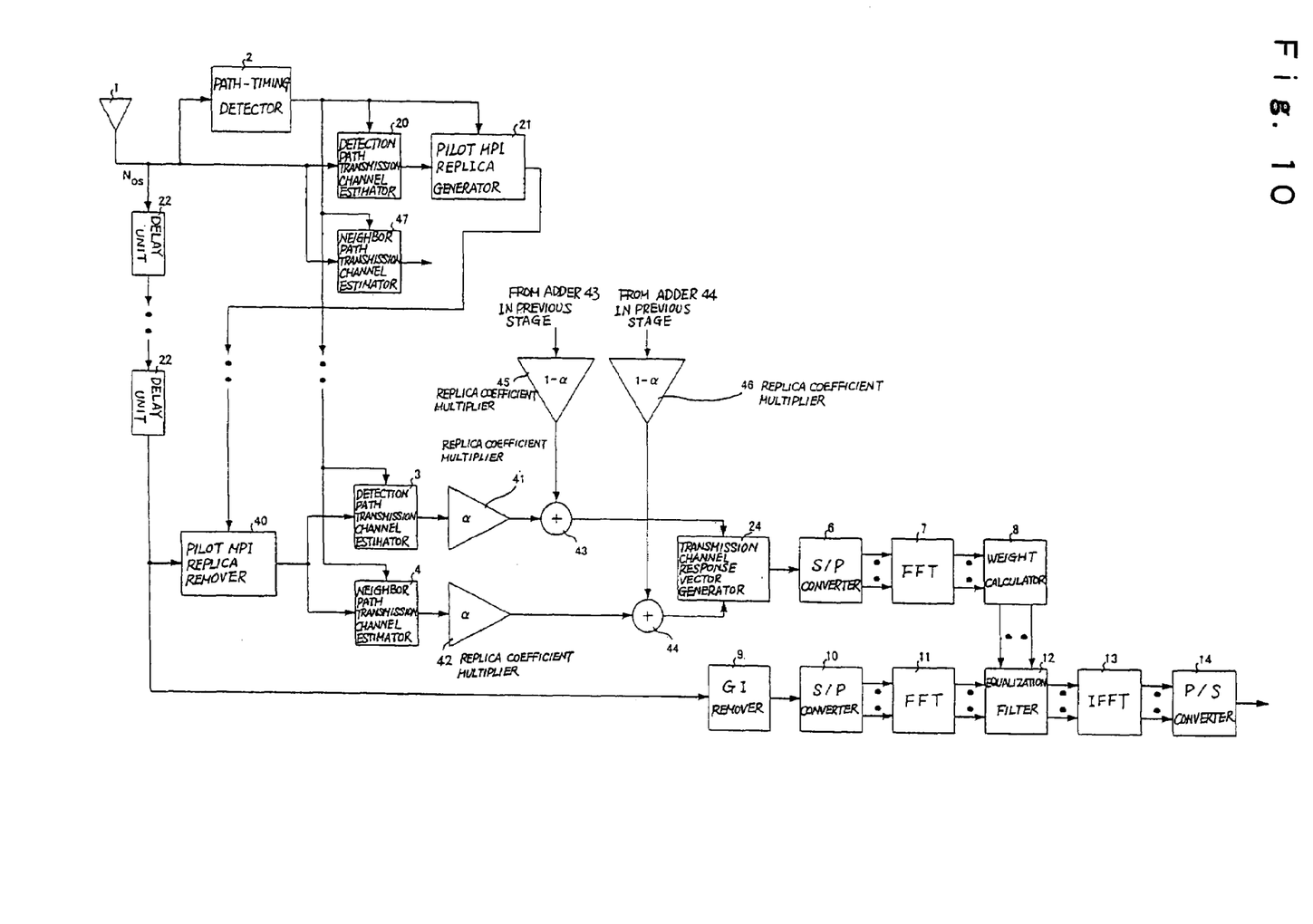
FIG. 10 is a block diagram showing another equalizer of the present invention.

Next, the second embodiment of the present invention will be described in detail with reference to the drawings. FIG. 10 is a block diagram showing a configuration of another equalizer of the present invention, the same components as in FIG. 3 being allotted with the same reference numerals. In FIG. 10, the second equalizer of the present invention is comprised of receiving antenna 1, path-timing detector 2, detection path transmission channel estimators 3 and 20, neighbor path transmission channel estimators 4 and 47, S/P converters 6 and 10, FFT portions 7 and 11, weight calculator 8, GI remover 9, equalization filter 12, IFFT portion 13, P/S converter 14, pilot MPI replica generator 21, delay unit 22, pilot MPI replica remover 40, transmission channel response vector generator 24, replica coefficient multipliers 41, 42, 45 and 46 and adders 43 and 44. In the second embodiment, the operation of each component other than pilot MPI replica remover 40 and the multiplying positions of replica coefficient multipliers 41, 42, 45 and 46, is the same as in the first embodiment. In the first embodiment, since pilot MPI replica remover 23 multiplies replica coefficient $\alpha$, $(1-\alpha)$ by over oversampled number $N_{OS}$ of samples of the pilot received signal with MPI removed and the pilot MPI replica signal for path I, and sums them, multiplication and addition are needed for every sample, resulting in increase in calculation quantity. In the second embodiment, replica coefficient $\alpha$ and $(1-\alpha)$ are multiplied by the transmission channel estimations, so that multiplication and addition are performed for every frame, to thereby suppress an increase in calculation quantity.

Figure 11:
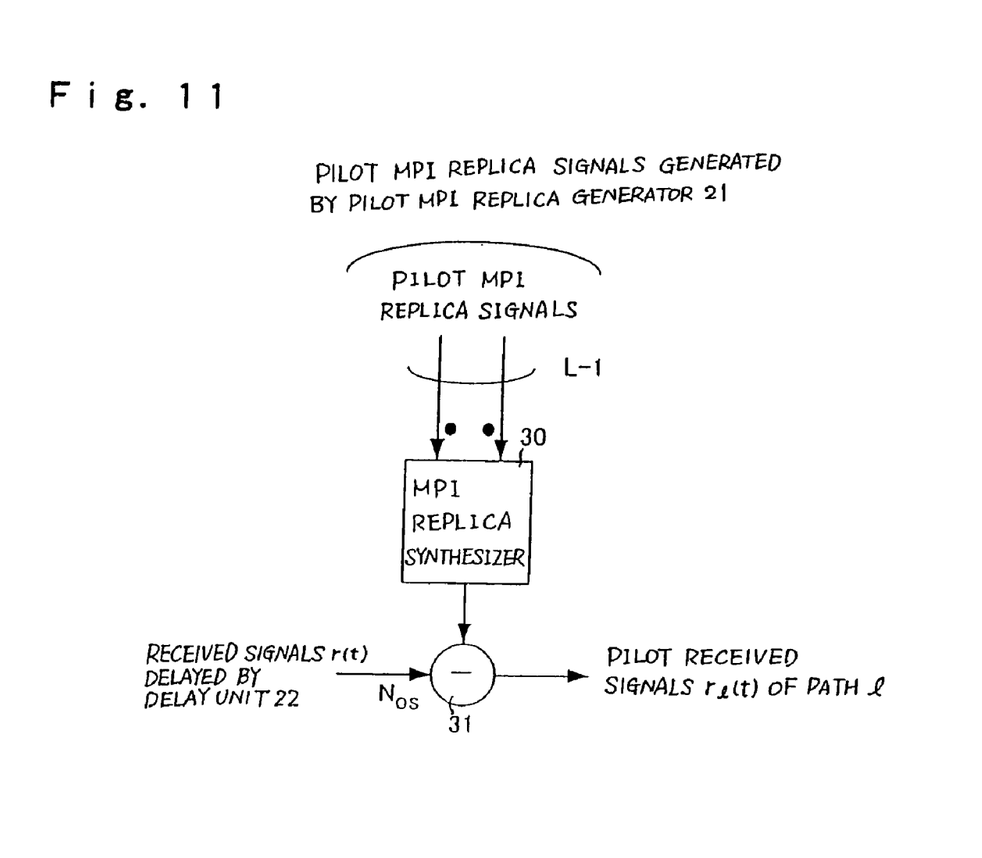
FIG. 11 is a block diagram showing a configuration of a pilot MPI replica remover in path I of the present invention.

Receiving antenna 1 receives a digitally modulated single carrier signal. Path-timing detector 2 receives as its input samples of the received signal in oversampled number $N_{OS}$ and detects the timings of L paths using the pilot signals time-multiplexed on the received signal. Detection path transmission channel estimator 20 receives as its input samples of the received signal in oversampled number $N_{OS}$ and the path timings detected at path-timing detector 2 and estimates transmission channel estimations at the timing for the detection paths, using the pilot signals time-multiplexed on the received signal. Neighbor path transmission channel estimator 47 receives as its input samples of the received signal in oversampled number $N_{OS}$ and the path timings detected at path-timing detector 2 and estimates the transmission channel estimations at the timings for the neighbor paths using the pilot signals time-multiplexed on the received signal. Pilot MPI replica generator 21 receives as its input the transmission channel estimations estimated at detection path transmission path estimator 20 and the path timings detected at path-timing detector 2, and generates a pilot MPI replica signal for each path. Delay unit 22 receives as its input samples of the received signal oversampled in number $N_{OS}$ and delays the received signal by the amount of processing time to generate pilot MPI replica signals. Pilot MPI replica remover 40 receives as its input oversampled number $N_{OS}$ of pilot received signals which have been delayed by delay unit 22 and oversampled number $N_{OS}$ of pilot MPI replica signals generated by pilot MPI replica generator 21, and subtracts the pilot MPI replica signals for other than the desired path from the pilot received signals of respective paths to generate pilot received signals with MPI removed. FIG. 11 is a block diagram showing a configuration of pilot MPI replica remover 40 for path I. Pilot MPI replica remover 40 is composed of MPI replica synthesizer 30 and subtracter 31. Each path has the same configuration. MPI replica synthesizer 30 receives as its input the pilot MPI replica signals generated at pilot MPI replica generator 21 in FIG. 10 and synthesizes (L−1) pilot MPI replica signals for other than path I. Subtracter 31 subtracts the pilot MPI replica signal synthesized at MPI replica synthesizer 30 from oversampled number $N_{OS}$ of pilot received signals that have been delayed by delay unit 22 in FIG. 10 to thereby generate pilot received signals with MPI removed. The pilot received signals with MPI removed is sent to detection path transmission channel estimator 3 and neighbor path transmission channel estimator 4 in FIG. 10.

Detection path transmission channel estimator 3 receives as its input oversampled number $N_{OS}$ of pilot received signals with MPI removed at pilot MPI replica remover 40 and the path timings detected at path-timing detector 2 and estimates the transmission channel estimations at the timings for the detection paths using the pilot signals time-multiplexed on the received signal. Neighbor path transmission channel estimator 4 receives as its input oversampled number $N_{OS}$ of pilot received signals with MPI removed at pilot MPI replica remover 40 and the path timings detected at path-timing detector 2, and estimates the transmission channel estimations at the timings for the neighbor paths using the pilot signals time-multiplexed on the received signal. Replica coefficient multipliers 41 and 42 respectively multiply the transmission channel estimations estimated at detection path transmission channel estimator 3 and neighbor path transmission channel estimator 4, by $\alpha$. Replica coefficient multipliers 45 and 46 respectively multiply the transmission channel estimations for the detection path and neighbor paths, which were added together in the previous stage at adders 43 and 44, by (1−$\alpha$). Adders 43 and 44, respectively add the transmission channel estimations that were obtained by multiplying the transmission channel estimations estimated at detection path transmission channel estimator 3 and neighbor path transmission channel estimator 4, by $\alpha$, and the transmission channel estimations that were obtained by multiplying the transmission channel estimations for the detection path and at neighbor paths, which were added in the previous stage at adders 43 and 44, by (1−$\alpha$). Transmission channel response vector generator 24 receives as its input the transmission path estimations for the detection path and neighbor paths, added at adders 43 and 44, to generate a transmission channel response vector. The subsequent weight calculation and equalization processes are the same as those in the first embodiment, so that description is omitted.

In the present embodiment, replica coefficient multipliers 45 and 46 are configured to use transmission channel estimations for the detection path and the neighbor paths, that were added in the previous stage by adders 43 and 44 but it is also possible to provide a configuration using the transmission channel estimations that were estimated in the previous stage by detection path transmission channel estimator 3 and by neighbor path transmission channel estimator 4.

As described heretofore, in the present embodiment it is possible to realize excellent equalization characteristics, by generating a transmission channel response vector free from MPI influence by use of MPIC, which is achieved by repeating the processing in pilot MPI replica generator 21 and pilot MPI replica remover 40 for plural number of stages and by using the vector to calculate the equalization weight. Further, control of replica coefficient $\alpha$ makes it possible to realize good characteristics with a lower number of stages. Moreover, it is also possible to suppress an increase in calculation quantity by multiplying replica coefficients by the transmission channel estimations.

Figure 12:
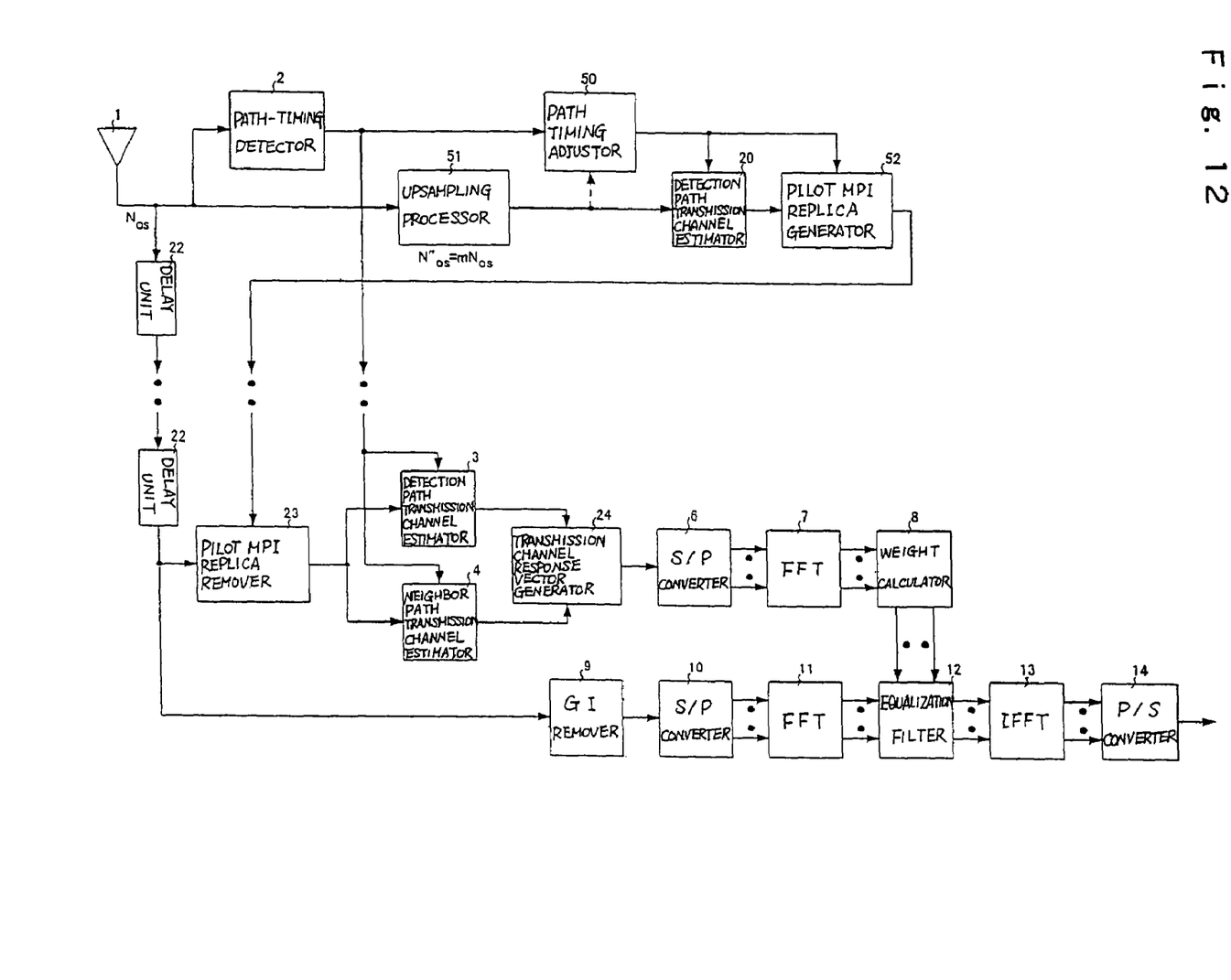
FIG. 12 is a block diagram showing still another equalizer of the present invention.

Next, the third embodiment of the present invention will be described in detail with reference to the drawings. FIG. 12 is a block diagram showing still another equalizer of the present invention, the same components as in FIG. 3 being allotted with the same reference numerals. In FIG. 12, the third equalizer of the present invention is comprised of receiving antenna 1, path-timing detector 2, path timing adjustor 50, upsampling processor 51, detection path transmission channel estimators 3 and 20, neighbor path transmission channel estimator 4, S/P converters 6 and 10, FFT portions 7 and 11, weight calculator 8, GI remover 9, equalization filter 12, IFFT portion 13, P/S converter 14, pilot MPI replica generator 52, delay unit 22, pilot MPI replica remover 23, transmission channel response vector generator 24. In the third embodiment, the operation of each component other than path timing adjustor 50, upsampling processor 51 and pilot MPI replica generator 52 is the same as in the first embodiment. In the first embodiment, since plural path sample method is used to provide tolerance to path timing errors, the resolution for path timing detection can be set at a low level. However, if the resolution for timing detection is lowered, the timing accuracy of the pilot MPI replica also lowers, and it is degraded the effect of pilot MPI replica removal. If timing resolution or oversampled number $N_{OS}$ is increased in order to improve timing accuracy of pilot MPI replica, the calculation quantity of all the processes such as path timing detection, FFT/IFFT, weight calculation, equalization processing, etc., increases. To deal with this, in the third embodiment, the effect of pilot MPI replica removal is improved by little increase of the calculation quantity, by improving the timing accuracy of pilot MPI replica while performing path timing detection at a low resolution.

Figure 13:
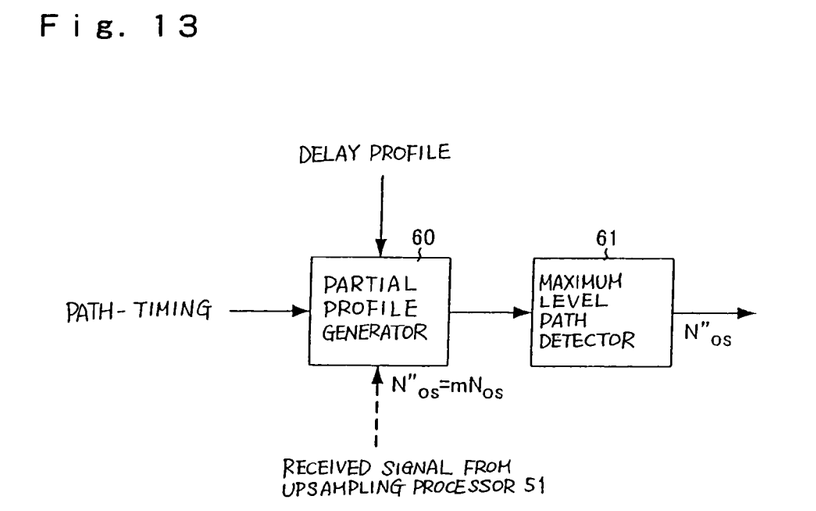
FIG. 13 is a block diagram showing a configuration of path timing adjustor of the present invention.

Receiving antenna 1 receives a digitally modulated single carrier signal. Path-timing detector 2 receives as its input samples of the received signal in oversampled number $N_{OS}$ and detects the timings of L paths using the pilot signals time-multiplexed on the received signal. Upsampling processor 51 upsamples oversampled number $N_{OS}$ of the received signal samples received by receiving antenna 1, in oversampled number $N''_{OS}$ ($N''_{OS}$=m $N_{OS}$, m is an integer equal to or greater than 1 and a power of 2). Path timing adjustor 50 adjusts the path timing selected by path-timing detector 2, based on the high-resolution partial profile generation of the peripheral portion. FIG. 13 is a block diagram showing the configuration of path timing adjustor 50. Path timing adjustor 50 is composed of partial profile generator 60 and maximum level path detector 61. Partial profile generator 60 receives as its input oversampled number $N_{OS}$ of delayed profiles generated at path-timing detector 2 and the timings of plural paths selected by path-timing detector 2 and interpolates oversampled number $N''_{OS}$ with delayed profiles at the peripheral portion of the path timings. Maximum level path detector 61 receives as its input the partial delay profile generated at partial profile generator 60 and determines the point with the maximum level to the path timing for each path. In this configuration, the calculation quantity is suppressed to a minimum by limiting the range for generating a partial delay profile to the peripheral portion of the path timing. It is also possible to provide such a configuration of partial profile generator 60 that, instead of receiving oversampled number $N_{OS}$ of delay profiles generated at path-timing detector 2, oversampled number $N''_{OS}$ of received signal samples interpolated by upsampling processor 51 are used to newly calculate a delay profile for the peripheral portion of the path timing. In this configuration, though the calculation quantity slightly increases compared to the case where the delay profile is interpolated, the partial delay profile can be calculated exactly.

Figure 14:
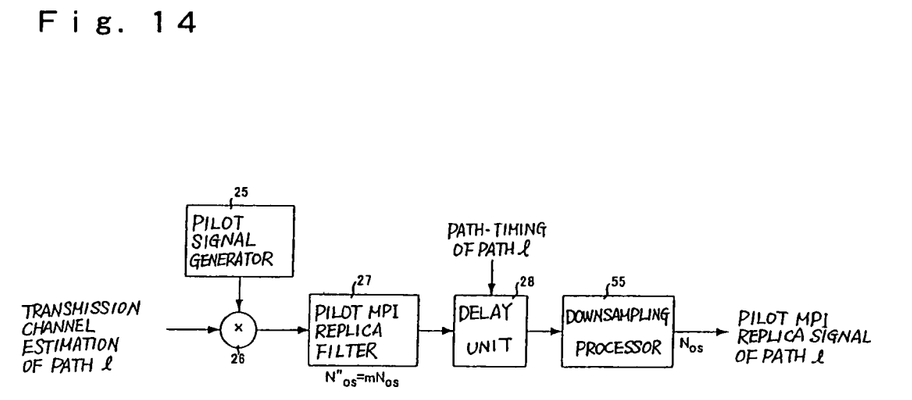
FIG. 14 is a block diagram showing a configuration of a pilot MPI replica generator in path I of the present invention.

Detection path transmission channel estimator 20 receives as its input oversampled number $N''_{OS}$ of received signal samples and the path timing adjusted at path timing adjustor 50, and estimates the transmission channel estimation at the timing of the detection path using the pilot signal time-multiplexed on the received signal. Pilot MPI replica generator 52 receives as its input the transmission channel estimation estimated at detection path transmission path estimator 20 and the path timing adjusted at path timing adjustor 50, and generates pilot MPI replica signal for each path. FIG. 14 is a block diagram showing the configuration of pilot MPI replica generator 52 in path I. Pilot MPI replica generator 52 is composed of pilot signal generator 25, multiplier 26, pilot MPI replica filter 27, delay unit 28 and downsampling processor 55. Each path has the same configuration. Pilot signal generator 25 generates a known pilot signal. Multiplier 26 receives as its input the transmission channel estimation estimated at detection path transmission channel estimator 20 in FIG. 12 and the known pilot signal generated by pilot signal generator 25, and generates a pilot MPI replica signal. Pilot MPI replica filter 27 shapes the waveform of the pilot MPI replica signal and performs conversion into oversampled number $N''_{OS}$. Delay unit 28 receives as its input the path timing adjusted at path timing adjustor 50 in FIG. 12 and oversampled number $N''_{OS}$ of pilot MPI replica signals converted at pilot MPI replica filter 27, and delays the pilot MPI replica signals by the path timing. Down-sampling processor 55 downsamples oversampled number $N''_{OS}$ of pilot MPI replica signals to oversampled number $N_{OS}$. Subsequent pilot MPI replica removal, transmission channel response vector generation, weight calculation and equalization process are the same as in the first embodiment, so description is omitted.

As described heretofore, in the present embodiment it is possible to realize excellent equalization characteristics, by generating a transmission channel response vector free from MPI influence by use of MPIC, which is achieved by repeating the processing in pilot MPI replica generator 52 and pilot MPI replica remover 23 for plural number of stages, and by using the vector to calculate the equalization weight. Further, control of replica coefficient α makes it possible to realize good characteristics with a lower number of stages. It is also possible to improve the effect of pilot MPI replica removal with a low increase of calculation quantity, by improving the timing accuracy of pilot MPI replica while performing path timing detection at a low resolution.

In the present invention, in the configuration using repeated MPIC over plural stages, individual replica coefficient $\alpha_i (0 < \alpha_i \leq 1$, i is the MPIC stage number) and $(1-\alpha_i)$ may be set up individually, stage by stage, so that it is possible to improve interference cancellation characteristics by optimizing the replica coefficient for each stage.

In the present invention, description has been made of the equalizer that generates a transmission channel response vector by arranging the transmission channel estimations at the detection path timing and at the neighbor path timings, but a case in which the number of neighbor paths is zero, i.e., the case in which the transmission channel estimation for the detection path only is arranged to generate a transmission channel response vector, is also included in the present invention.

In the present invention, description has been made of the frequency equalizer that generates a transmission channel response vector free from MPI influence by time-domain signal processing and that performs equalization by frequency-domain signal processing, but the present invention can be applied to a chip equalizer that performs equalization by time-domain signal processing using a similar transmission channel response vector.

The present invention has been described taking an example of an equalizer that is assumed to have one antenna for transmission and one for reception, but the present invention can also be applied to a MIMO (multiple input multiple output) scheme having plural antennas for transmission and plural antennas for reception.

Further, the present invention can be applied to either the base station wireless terminal or the mobile station wireless terminal in a mobile communication system.

While a preferred embodiment of the present invention has been described using specific terms, such description is for illustrative purposes only, and it is to be understood that changes and variations may be made without departing from the spirit or scope of the following claims.

What is claimed is:

1. An equalizer which receives a digitally modulated single carrier signal and calculates an equalization weight using a transmission channel response vector that is arranged with transmission channel estimations at the detection path timing and at the neighbor path timings thereof, comprising:
   path-timing detector for detecting the timings of L paths (L is an integer equal to or greater than 1) based on a pilot signal time-multiplexed on a received signal that has been sampled at oversampled number $N_{OS}$;
   pilot MPI replica generator for generating a pilot multipath interference (MPI) replica signal for each path, based on the transmission channel estimation of the detection path;
   pilot MPI replica remover for generating a pilot received signal with MPI removed by subtracting each of pilot MPI replica signals for other than a desired path, from the pilot received signal;
   transmission channel response vector generator for generating a transmission channel response vector, based on the transmission channel estimations for the detection path and neighbor paths, using the pilot received signal with MPI removed;
   weight calculator for calculating an equalization weight using the transmission channel response vector; and
   equalization filter for performing equalization of the received signal with the equalization weight.

2. An equalizer according to claim 1, wherein the path-timing detector comprises:
   delay profile generator for generating a delay profile based on a sliding correlation detection result between the pilot signal time-multiplexed on samples of the received signal in oversampled number $N_{OS}$ and a known pilot signal sequence; and
   path-timing selector for selecting timings of plural paths having high levels, using the delay profile.

3. An equalizer according to claim 1, wherein the pilot MPI replica generator comprises:
   pilot signal generator for generating a known pilot signal;
   multiplier for generating a pilot MPI replica signal using the transmission channel estimation of the detection path and the known pilot signal;
   pilot MPI replica filter for shaping the waveform of the pilot MPI replica signal and performing conversion into oversampled number $N_{OS}$; and
   delay unit for delaying the pilot MPI replica signal by the path timing, using the path timing detected at the path-timing detector and the output from the pilot MPI replica filter.

4. An equalizer according to claim 1, wherein the pilot MPI replica remover comprises:
MPI replica synthesizer for synthesizing (L−1) pilot MPI replica signals other than that of a desired path I (1≦I≦L) using the output from the pilot MPI replica generator;
subtracter for generating a pilot received signal with MPI removed, by subtracting the synthesized pilot MPI replica signal obtained from the MPI replica synthesizer, from the pilot received signal;
first replica coefficient multiplier for multiplying the pilot received signal with MPI removed, by a first replica coefficient α (0<α≦1);
second replica coefficient multiplier for multiplying the pilot MPI replica signal of desired path I, generated at the pilot MPI replica generator, by a second replica coefficient (1−α); and
adder for adding the output from the first replica coefficient multiplier and the output from the second replica coefficient multiplier.

5. An equalizer according to claim 1, wherein the pilot MPI replica generator and the pilot MPI replica remover repeat the process in a plural number of stages, the pilot MPI replica remover comprises:
MPI replica synthesizer for synthesizing (L−1) pilot MPI replica signals other than that of a desired path I (1≦I≦L) using the output from the pilot MPI replica generator;
subtracter for generating a pilot received signal with MPI removed, by subtracting the synthesized pilot MPI replica signal obtained from the MPI replica synthesizer, from the pilot received signal;
first replica coefficient multiplier for multiplying the pilot received signal with MPI removed, by a first replica coefficient $\alpha_i$ (0<$\alpha_i$≦1, i is the stage number of multipath interference canceller (MPIC));
second replica coefficient multiplier for multiplying the pilot MPI replica signal of desired path I, generated at the pilot MPI replica generator, by a second replica coefficient (1−$\alpha_i$); and
adder for adding the output from the first replica coefficient multiplier and the output from the second replica coefficient multiplier, and
the first replica coefficient $\alpha_i$ and second replica coefficient (1−$\alpha_i$) are set individually, stage by stage.

6. An equalizer according to claim 1, wherein the weight calculator and the equalization filter perform the process by signal processing in the frequency domain.

7. An equalizer according to claim 1, wherein the weight calculator and the equalization filter perform the process by signal processing in the time domain.

8. An equalizer according to claim 1, wherein the weight calculator calculates the weight for the equalization filter based on the minimum means-square error method (MMSE) or the zero-forcing method.

9. An equalizer which receives a digitally modulated single carrier signal and calculates an equalization weight using a transmission channel response vector that is arranged with transmission channel estimations at the detection path timing and at the neighbor path timings thereof, comprising:
path-timing detector for detecting the timings of L paths (L is an integer equal to or greater than 1) based on a pilot signal time-multiplexed on a received signal that has been sampled at oversampled number $N_{OS}$;
pilot MPI replica generator for generating a pilot MPI replica signal for each path, based on the transmission channel estimation of the detection path;
pilot MPI replica remover for generating a pilot received signal with MPI removed by subtracting each of pilot MPI replica signals for other than a desired path, from the pilot received signal;
first replica coefficient multiplier for estimating transmission channel estimations for the detection path and neighbor paths using the pilot received signal with MPI removed and multiplying each of the transmission channel estimations by a first replica coefficient α (0<α≦1);
second replica coefficient multiplier for multiplying each of the transmission channel estimations for the detection path and neighbor paths, estimated at the previous stage, by a second replica coefficient (1−α);
adder for adding the output from the first replica coefficient multiplier and the output from the second replica coefficient multiplier;
transmission channel response vector generator for generating a transmission channel response vector, based on the transmission channel estimations for the detection path and neighbor paths that is output of the adder;
weight calculator for calculating an equalization weight using the transmission channel response vector; and
equalization filter for performing equalization of the received signal with the equalization weight.

10. An equalizer according to claim 9, wherein the path-timing detector comprises:
delay profile generator for generating a delay profile based on a sliding correlation detection result between the pilot signal time-multiplexed on samples of the received signal in oversampled number $N_{OS}$ and a known pilot signal sequence; and
path-timing selector for selecting timings of plural paths having high levels, using the delay profile.

11. An equalizer according to claim 9, wherein the pilot MPI replica generator comprises:
pilot signal generator for generating a known pilot signal;
multiplier for generating a pilot MPI replica signal using the transmission channel estimation of the detection path and the known pilot signal;
pilot MPI replica filter for shaping the waveform of the pilot MPI replica signal and performing conversion into oversampled number $N_{OS}$; and
delay unit for delaying the pilot MPI replica signal by the path timing, using the path timing detected at the path-timing detector and the output from the pilot MPI replica filter.

12. An equalizer according to claim 9, wherein the pilot MPI replica remover comprises:
MPI replica synthesizer for synthesizing (L−1) pilot MPI replica signals other than that of a desired path I (1≦I≦L) using the output from the pilot MPI replica generator; and
subtracter for generating a pilot received signal with MPI removed, by subtracting the synthesized pilot MPI replica signal obtained from the MPI replica synthesizer, from the pilot received signal.

13. An equalizer according to claim 9, wherein the pilot MPI replica generator and the pilot MPI replica remover repeat the process in a plural number of stages, and the first replica coefficient $\alpha_i$ (0<$\alpha_i$≦1, i is the stage number of MPIC) and the second replica coefficient (1−$\alpha_i$) are set individually, stage by stage.

14. An equalizer according to claim 9, wherein the weight calculator and the equalization filter perform the process by signal processing in the frequency domain.

15. An equalizer according to claim 9, wherein the weight calculator and the equalization filter perform the process by signal processing in the time domain.

16. An equalizer according to claim 9, wherein the weight calculator calculates the weight for the equalization filter based on the minimum means-square error method (MMSE) or the zero-forcing method.

17. An equalizer which receives a digitally modulated single carrier signal and calculates an equalization weight using a transmission channel response vector that is arranged with transmission channel estimations at the detection path timing and at the neighbor path timings thereof, comprising:
- path-timing detector for detecting the timings of L paths (L is an integer equal to or greater than 1) based on a pilot signal time-multiplexed on a received signal that has been sampled at oversampled number $N_{OS}$;
- upsampling processor for upsampling the received signal in oversampled number $N''_{OS}$ ($N''_{OS}$=m $N_{OS}$, m is an integer equal to or greater than 1 and a power of 2);
- path-timing adjustor for adjusting the path timings that have been selected at the path-timing detector, based on high-resolution partial profile generation of their peripheral part;
- pilot MPI replica generator for generating a pilot MPI replica signal for each path, based on the transmission channel estimations at the path-timings adjusted at the path-timing adjustor;
- pilot MPI replica remover for generating a pilot received signal with MPI removed by subtracting each of pilot MPI replica signals for other than a desired path, from the pilot received signal;
- transmission channel response vector generator for generating a transmission channel response vector, based on the transmission channel estimations for the detection path and neighbor paths, using the pilot received signal with MPI removed;
- weight calculator for calculating an equalization weight using the transmission channel response vector; and
- equalization filter for performing equalization of the received signal with the equalization weight.

18. An equalizer according to claim 17, wherein the path-timing detector comprises:
- delay profile generator for generating a delay profile based on a sliding correlation detection result between the pilot signal time-multiplexed on samples of the received signal in oversampled number $N_{OS}$ and a known pilot signal sequence; and
- path-timing selector for selecting timings of plural paths having high levels, using the delay profile.

19. An equalizer according to claim 17, wherein the path-timing adjustor comprises:
- partial profile generator for interpolating oversampled number $N''_{OS}$ with delay profiles at the peripheral portion of the path timings, using oversampled number $N_{OS}$ of delay profiles generated at the path-timing detector and the plural path timings selected at the path-timing detector; and
- maximum level path detector for determining the point with the maximum level to the path timing for each path, using the output from the partial profile generator.

20. An equalizer according to claim 17, wherein the path-timing adjustor comprises:
- partial profile generator for newly calculating a delay profile for the peripheral portion of the path timings, using the timings of the plural paths selected at the path-timing detector and the received signal sampled in oversampled number $N''_{OS}$ interpolated by the upsampling processor; and
- maximum level path detector for determining the point with the maximum level to the path timing for each path, using the output from the partial profile generator.

21. An equalizer according to claim 17, wherein the pilot MPI replica generator comprises:
- pilot signal generator for generating a known pilot signal;
- multiplier for generating a pilot MPI replica signal using the transmission channel estimation of the detection path and the known pilot signal;
- pilot MPI replica filter for shaping the waveform of the pilot MPI replica signal and performing conversion into oversampled number $N''_{OS}$;
- delay unit for delaying the pilot MPI replica signal by the path timing, using the path timing adjusted at the path-timing adjustor and the output from the pilot MPI replica filter; and
- downsampling processor for downsampling oversampled number $N''_{OS}$ of pilot MPI replica signals to oversampled number $N_{OS}$.

22. An equalizer according to claim 17, wherein the pilot MPI replica remover comprises:
- MPI replica synthesizer for synthesizing (L−1) pilot MPI replica signals other than that of a desired path I ($1 \leq I \leq L$) using the output from the pilot MPI replica generator;
- subtracter for generating a pilot received signal with MPI removed, by subtracting the synthesized pilot MPI replica signal obtained from the MPI replica synthesizer, from the pilot received signal;
- first replica coefficient multiplier for multiplying the pilot received signal with MPI removed, by a first replica coefficient $\alpha$ ($0 < \alpha \leq 1$);
- second replica coefficient multiplier for multiplying the pilot MPI replica signal of desired path I, generated at the pilot MPI replica generator, by a second replica coefficient $(1-\alpha)$; and
- adder for adding the output from the first replica coefficient multiplier and the output from the second replica coefficient multiplier.

23. An equalizer according to claim 17, wherein the pilot MPI replica generator and the pilot MPI replica remover repeat the process in a plural number of stages, the pilot MPI replica remover comprising:
- MPI replica synthesizer for synthesizing (L−1) pilot MPI replica signals other than that of a desired path I ($1 \leq I \leq L$) using the output from the pilot MPI replica generator;
- subtracter for generating a pilot received signal with MPI removed, by subtracting the synthesized pilot MPI replica signal obtained from the MPI replica synthesizer, from the pilot received signal;
- first replica coefficient multiplier for multiplying the pilot received signal with MPI removed, by a first replica coefficient $\alpha_i$ ($0 < \alpha_i \leq 1$, i is the stage number of MPIC);
- second replica coefficient multiplier for multiplying the pilot MPI replica signal of desired path I, generated at the pilot MPI replica generator, by a second replica coefficient $(1-\alpha_i)$; and
- adder for adding the output from the first replica coefficient multiplier and the output from the second replica coefficient multiplier, and
- the first replica coefficient $\alpha_i$ and second replica coefficient $(1-\alpha_i)$ are set individually, stage by stage.

24. An equalizer according to claim 17, wherein the weight calculator and the equalization filter perform the process by signal processing in the frequency domain.

25. An equalizer according to claim 17, wherein the weight calculator and the equalization filter perform the process by signal processing in the time domain.

26. An equalizer according to claim 17, wherein the weight calculator calculates the weight for the equalization filter based on the minimum means-square error method (MMSE) or the zero-forcing method.

27. An equalization method of receiving a digitally modulated single carrier signal and calculating an equalization weight using a transmission channel response vector that arranges transmission channel estimation at the detection path timing and at the neighbor path timings thereof, comprising the steps of:
  detecting the timings of L paths (L is an integer equal to or greater than 1) based on a pilot signal time-multiplexed on a received signal that has been sampled at oversampled number $N_{OS}$;
  generating a pilot MPI replica signal for each path, based on the transmission channel estimation of the detection path;
  generating a pilot received signal with MPI removed by subtracting each of pilot MPI replica signals for other than a desired path, from the pilot received signal;
  generating a transmission channel response vector, based on the transmission channel estimations for the detection path and neighbor paths, using the pilot received signal with MPI removed;
  calculating an equalization weight using the transmission channel response vector; and
  performing equalization of the received signal with the equalization weight.

28. An equalization method of receiving a digitally modulated single carrier signal and calculating an equalization weight using a transmission channel response vector that arranges transmission channel estimation at the detection path timing and at the neighbor path timings thereof, comprising the steps of:
  detecting the timings of L paths (L is an integer equal to or greater than 1) based on a pilot signal time-multiplexed on a received signal that has been sampled at oversampled number $N_{OS}$;
  generating a pilot MPI replica signal for each path, based on the transmission channel estimation of the detection path;
  generating a pilot received signal with MPI removed by subtracting each of pilot MPI replica signals for other than a desired path, from the pilot received signal;
  estimating transmission channel estimations for the detection path and neighbor paths using the pilot received signal with MPI removed;
  adding transmission channel estimations that are obtained by multiplying the transmission channel estimations by replica coefficient $\alpha$ ($0<\alpha\leq1$) respectively, to transmission channel estimations that are obtained by multiplying the transmission channel estimations for the detection path and for the neighbor paths, estimated in the previous stage, by replica coefficient ($1-\alpha$), and generating a transmission channel response vector, based on the transmission channel estimations for the detection path and neighbor paths, obtained as a result of addition;
  calculating an equalization weight using the transmission channel response vector; and
  performing equalization of the received signal with the equalization weight.

29. An equalization method of receiving a digitally modulated single carrier signal and calculating an equalization weight using a transmission channel response vector that arranges transmission channel estimation at the detection path timing and at the neighbor path timings thereof, comprising the steps of:
  selecting timings of L paths (L is an integer equal to or greater than 1) based on a pilot signal time-multiplexed on a received signal that has been sampled at oversampled number $N_{OS}$;
  upsampling the received signal in oversampled number $N''_{OS}$ ($N''_{OS}$=m $N_{OS}$, m is an integer equal to or greater than 1 and a power of 2);
  adjusting the path timings that have been selected, based on high-resolution partial profile generation of their peripheral portion;
  generating a pilot MPI replica signal for each path, based on the transmission channel estimations at the adjusted path-timings;
  generating a pilot received signal with MPI removed by subtracting each of pilot MPI replica signals for other than a desired path, from the pilot received signal;
  generating a transmission channel response vector, based on the transmission channel estimations for the detection path and neighbor paths, using the pilot received signal with MPI removed;
  calculating an equalization weight using the transmission channel response vector; and
  performing equalization of the received signal with the equalization weight.

* * * * *